Sept. 9, 1941.   J. H. COHEN   2,255,412
WINDSHIELD HEATER
Filed March 21, 1934
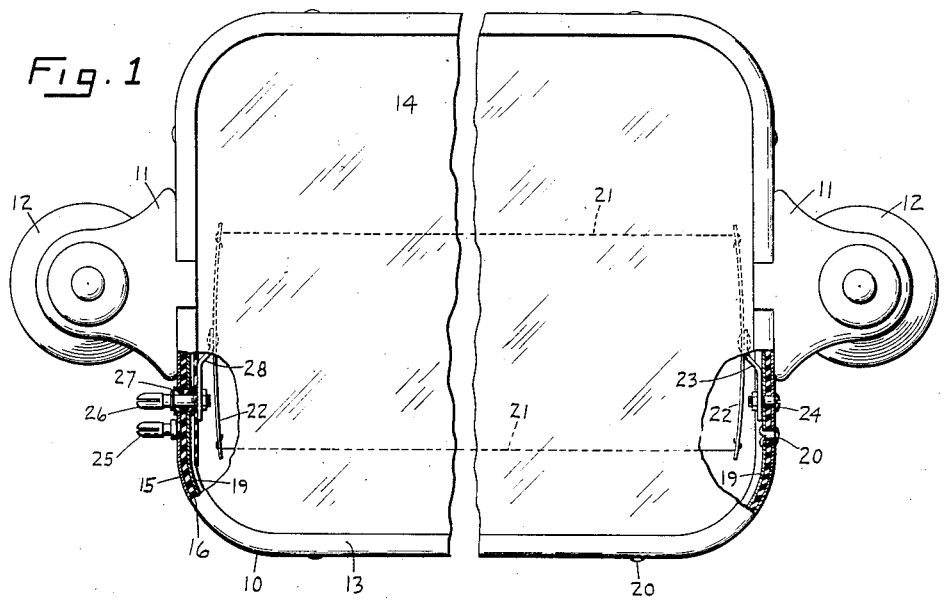
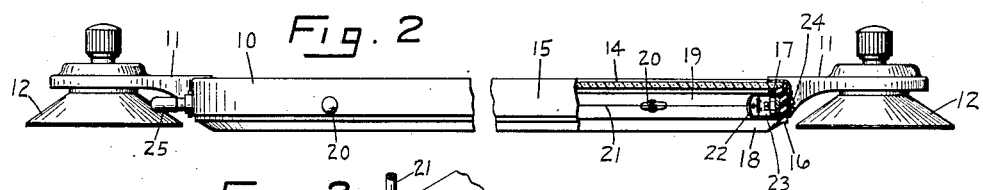
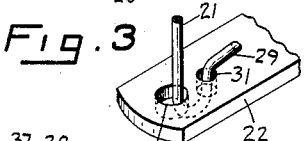
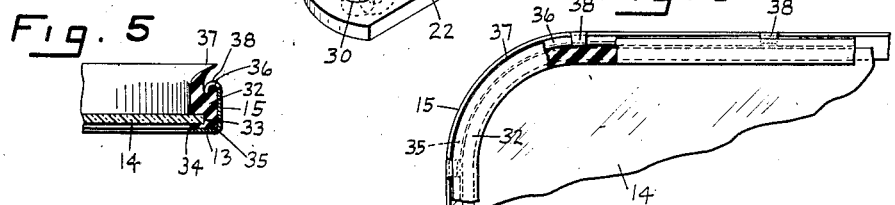
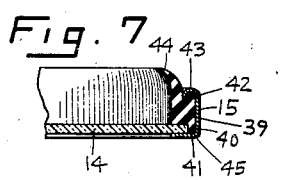
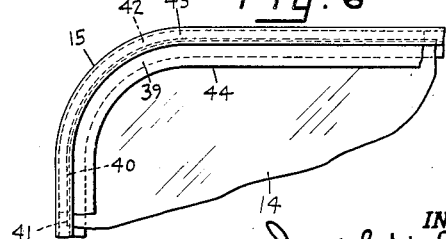
INVENTOR
Joseph H. Cohen
BY
ATTORNEY Patented Sept. 9, 1941

2,255,412

UNITED STATES PATENT OFFICE 2,255,412

WINDSHIELD HEATER

Joseph H. Cohen, Bridgeport, Conn.

Application March 21, 1934, Serial No. 716,659

12 Claims. (Cl. 20—40.5)

This invention relates to defrosters and heaters for windshields of motor vehicles and the like.

An object of the present invention is to provide a frame for a device of the character referred to and a sealing member to go between the frame and the glass of the window or windshield, so that the latter holds and maintains the glass of the combined heater and defroster in operative position in the frame.

Another object of this invention is to provide improved means for attaching the heating wires to the parts carrying them in such a way as to avoid the necessity of making knots in the wires and thereby weakening the same.

Other features and advantages will hereinafter appear.

In the accompanying drawing—

Figure 1 is a front elevation, partly in section, of a combined windshield heater and defroster of the present invention.

Fig. 2 is a side elevation, partly in section, of the device shown in Fig. 1.

Fig. 3 is a detail perspective view showing the way in which the heating wire is connected to its carrying part, according to the present invention.

Fig. 4 is a bottom plan view of one form of this invention, in which the rubber sealing member is held to the frame by ears or tabs.

Fig. 5 is a sectional view of the arrangement shown in Fig. 4.

Fig. 6 is a bottom plan view of another modification of this invention, in which the sealing member is clinched in place by a continuous rim.

Fig. 7 is a sectional view of the form of the invention shown in Fig. 6.

As shown in the accompanying drawing, the device of the present invention comprises a metal frame 10, preferably made of sheet metal, and being generally rectangular in shape with round corners. At each end of the frame there is a projecting arm 11 carrying a suction cup 12 by means of which the device may be attached to the window or windshield of a motor vehicle or the like.

The frame has a narrow front margin 13 behind which there is supported a window or glass 14 through which the cleared portion of the windshield may be viewed. As shown in Figs. 1 and 2, the glass 14 bears directly on the front portion 13 of the frame, and, lying along side of a circumferential flange 15, there is a packing strip 16 preferably of rubber. The packing or sealing strip 16 has a flange 17 overlying the flange 13 of the frame and engaging the glass. The rubber packing or sealing piece 16 is provided with a lip 18 adapted to engage the windshield and form a moisture-tight seal to prevent condensation from forming on the inside portion of the windshield over which the device is supported.

The sealing strip 16 is held in place by narrow metal strips 19 extending around the inside of the sealing strip and held to the main frame by rivets 20.

The space between the glass 14 and the windshield is heated by heating wires 21 of which there may be two or more stretched across the field covered by the glass. These wires are mounted on resilient strips 22 at each end of the frame. One of the strips 22 is connected to an arm 23 and this is secured to the main frame by a bolt 24 so that current may reach the connected resilient strip 22 through the frame. At the other end of the frame, a contact pin 25 is electrically and mechanically connected to the frame 10 as shown in Fig. 1. The companion contact pin 26, however, is insulated from the frame by insulating material 27 and supports at its inner end an arm 28 carrying the adjacent resilient bar 22, the arm 28 being insulated from the frame and a suitable plug and cord connected to a source of current being applied to the pins, current will flow from the pin 25 through the frame to the arm 23, thence through the arm 22, wires 21 and the opposite arm 22, the arm 28 carrying the latter and the pin contact 26.

Heretofore, the wires 21 were secured to carrying bars 22 by being passed through an aperture and then knotted or tied. According to the present invention, this operation, which of necessity weakened the structure of the wire and was tedious and time-consuming, is obviated. This is done by weaving the end 29 of the wire first through an aperture 30 to the opposite side of the arm 22 and then forwardly through a similar aperture 31, after which the end 29 of the wire is bent down to lie substantially in the plane of the arm 22. When this is done, any pull on the wire causes the end 29 to jam against the sides of the apertures 30 and 31, with the result that the wire is held from slipping with relation to the bar 22. Since the bars 22 are resilient and the wires are normally under tension, the wire, immediately upon being secured in place, becomes clutched by the bar 22, and, since the tension is never relieved, no slippage can take place.

In the form of the invention shown in Figs. 1 and 2, the glass in the sealing strip is held in place by the inner frame or strips 19. The necessity of providing these strips is obviated in the form of the invention shown in Figs. 4, 5, 6 and 7. In the form of the invention shown in Figs. 4 and 5, the sealing strip 32 is made substantially wider than the strip 16 shown in Fig. 1. It is provided with a channel 33 into which the edge of the glass 14 extends, a portion 34 of the sealing strip, which is preferably of rubber, being located between the glass and the part 13 of the frame. Likewise, there is a wall 35 of the sealing strip located between the edge of the glass and the part 15 of the frame.

Hence, the glass is free for movement in all directions relative to the frame but against the yielding resistance of the sealing strip 32, and thus breakage in use and shipment is largely avoided.

The sealing strip, in the form of the invention shown in Figs. 4 and 5, has a circumferential bead 36 from the inside of which rises an outwardly flared lip 37 which engages the windshield.

To hold the glass 14 and the sealing strip 32 in the frame, tabs 38 are provided on the portion 15 of the frame, and these are bent over the circumferential bead 36 on the sealing strip.

In the form of the invention shown in Fig. 7, the sealing strip 39 is provided with a cut-out at its lower inner corner 40 for engaging the outer margin and edge 41 of the glass 14. It has a circumferential bead 42. This bead 42 is engaged by an inverted rim 43 on the portion 15 of the frame. The bead 42 fits snugly within the arm 43 and the lip portion 44 rises from the inner edge of the bead and is adapted to engage the windshield to exclude moisture from the field covered by the device.

In assembling the device shown in Fig. 7, the pane of glass 14 is placed in the frame, then the sealing piece 39, which is in strip form, is worked around the frame until the lower portion 45 fits between the part 15 of the frame and the edge of the pane of glass, and the bead 42 is located under the arm 43.

Variations and modifications may be made within the scope of this invention and portions of the improvements may be used without others.

Having thus described the invention, what is claimed as new and for which it is desired to obtain Letters Patent, is:

1. A device to be mounted on a windshield comprising a metal frame having a reveal opening; a pane of glass fitting within the frame; a resilient sealing strip inserted in said frame and disposed between the latter and said pane and constituting means for sealing and retaining the pane in the frame; and a clincher rim on the frame engaging an abutment on the sealing strip for holding the same in the frame.

2. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, the sealing strip having a circumferential bead and the frame having means for engaging the bead for retaining the sealing strip in the frame.

3. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, the sealing strip having a circumferential bead and the frame having tabs engaging said bead to retain the sealing strip in the frame.

4. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, the sealing strip having a circumferenital bead and the frame having an inverted rim in which the bead is sprung.

5. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, the frame having a clincher rim and the sealing strip having a bead sprung into said rim.

6. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, the frame having tabs fitting over a portion of the sealing member to retain the sealing member within the frame.

7. A device to be mounted on a windshield comprising a metal frame having a reveal opening and being substantially L-shaped in cross section; a pane of glass fitting within the frame and engaging the frame at the margin of the reveal; a sealing member inserted in said frame between the latter and the pane of glass and constituting the sealing means for retaining the pane in the frame, said sealing member having an abutment therearound; and clincher means on the frame engaging the abutment to lock the sealing member in the frame and in sealing relation.

8. A device to be mounted on a windshield comprising a metal frame having a reveal opening and being substantially L-shaped in cross section; a pane of glass fitting within the frame and engaging the frame at the margin of the reveal; and a sealing member inserted in said frame between the latter and the pane of glass and constituting the sealing means for retaining the pane in the frame, said sealing strip having a lip extending beyond said frame to engage the surface of a windshield or the like, the frame having a clincher rim and the sealing strip having a bead sprung into said rim.

9. A device to be mounted on a windshield comprising a metal frame having a reveal opening; a pane of glass fitting within the frame; and a resilient sealing strip inserted in said frame and disposed between the latter and said pane and constituting means for sealing and retaining the pane in the frame, said sealing strip having a lip extending beyond said frame to engage the surface of a windshield or the like, the frame having a clincher rim and the sealing strip having a bead sprung into said rim.

10. A device to be mounted on a windshield comprising a metal frame having a reveal opening and being substantially L-shaped in cross section; a pane of glass fitting within said frame; a sealing strip having a grooved portion fitting over and embracing the marginal edge of the pane and having a portion interposed between the pane and the margin of the reveal; and means on the sealing strip and a clincher rim on the frame interlocking with a bead on the sealing strip to hold the sealing strip in the frame, said sealing strip having a lip extending beyond the frame in the position to engage the surface of a windshield.

11. In combination, a continuous rubber seal having an inner groove and a continuous outwardly directed flexible lip disposed laterally of said groove; a transparent sheet having its peripheral edge confined within said groove; a continuous metal frame embracing the grooved portion of the seal in the plane of the sheet and disposed remote from said lip, the frame having a clincher rim and the rubber seal having a bead thereon sprung into the clincher rim and compressed by said rim whereby the seal is locked to the frame.

12. In combination, a continuous metal frame; a transparent sheet disposed entirely within said frame near one edge thereof; a continuous rubber seal supported by and forming a lining for the interior of said frame, said seal having a continuous preformed internal groove for directly receiving the entire peripheral edge portion of said sheet and also having a continuous preformed laterally projecting sealed lip remote from said groove and extending outwardly beyond said frame; and means including a clinching means carried by the frame and engaging a bead preformed on the exterior surface of the rubber seal adjacent the edge of said frame and sprung into the clinching means for locking the seal in the frame.

JOSEPH H. COHEN.